Patented June 24, 1930

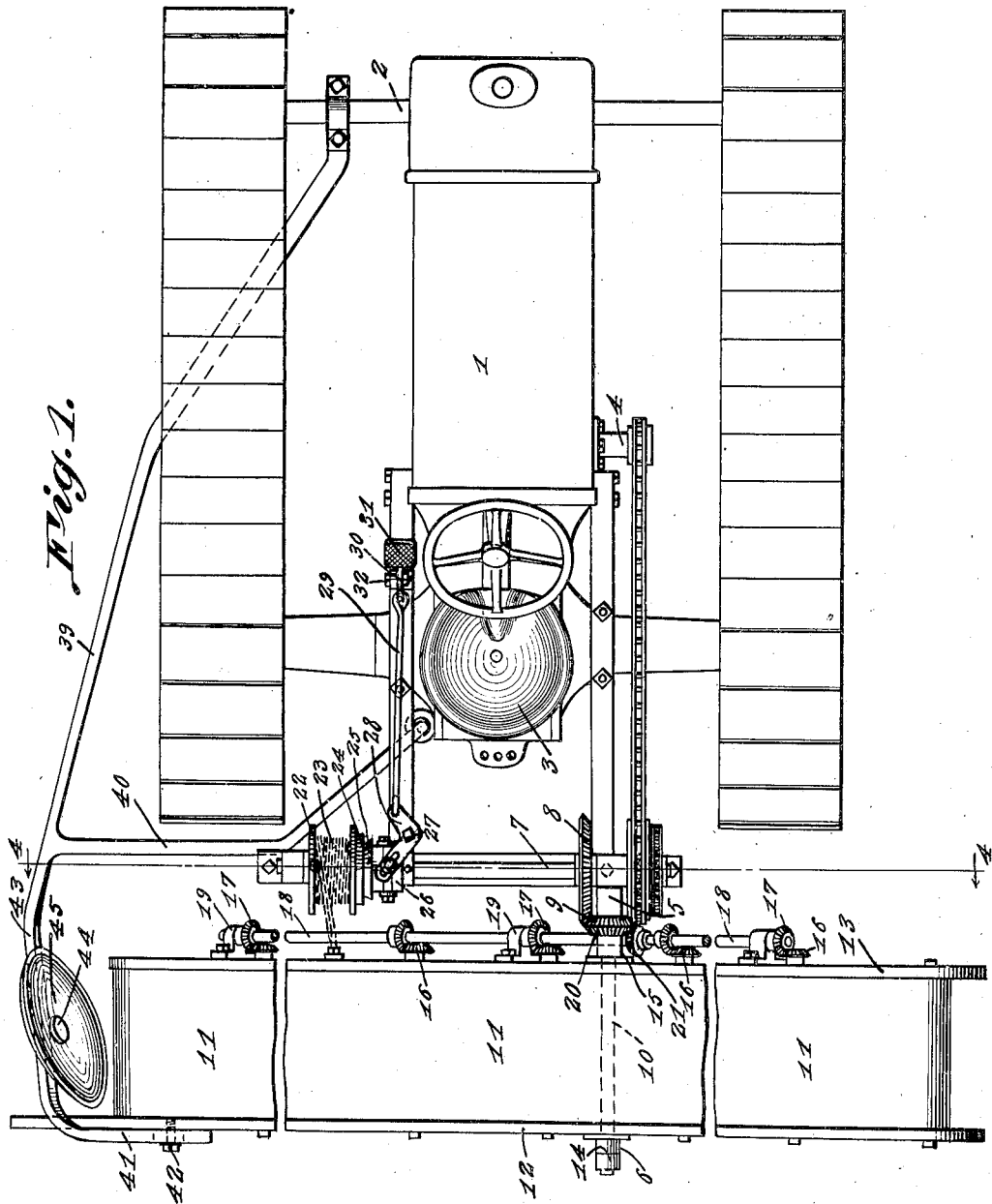

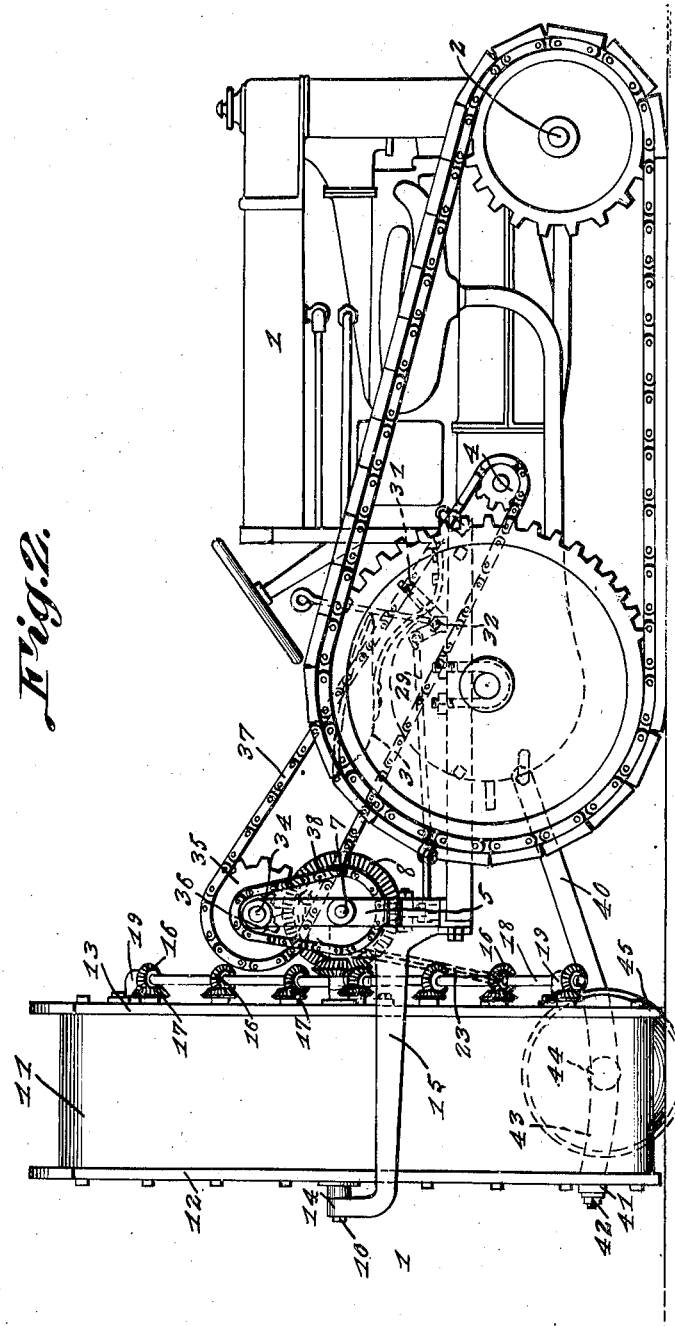

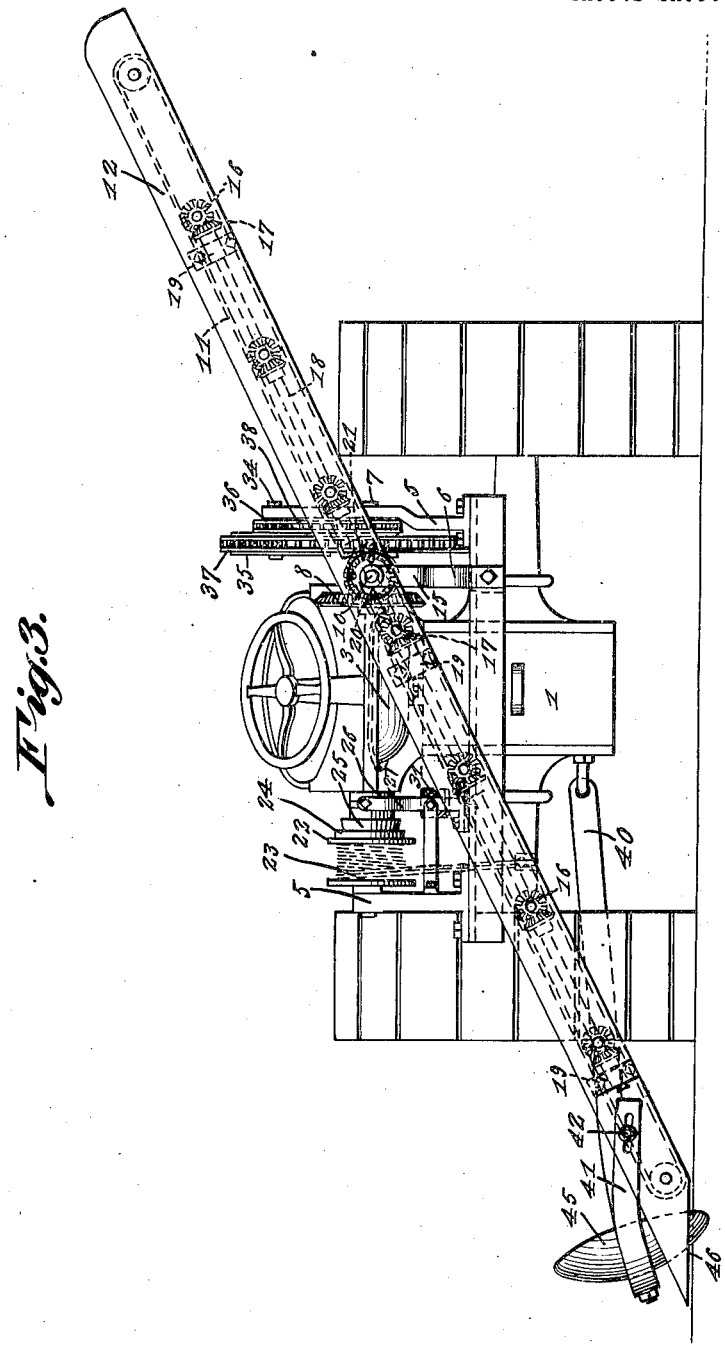

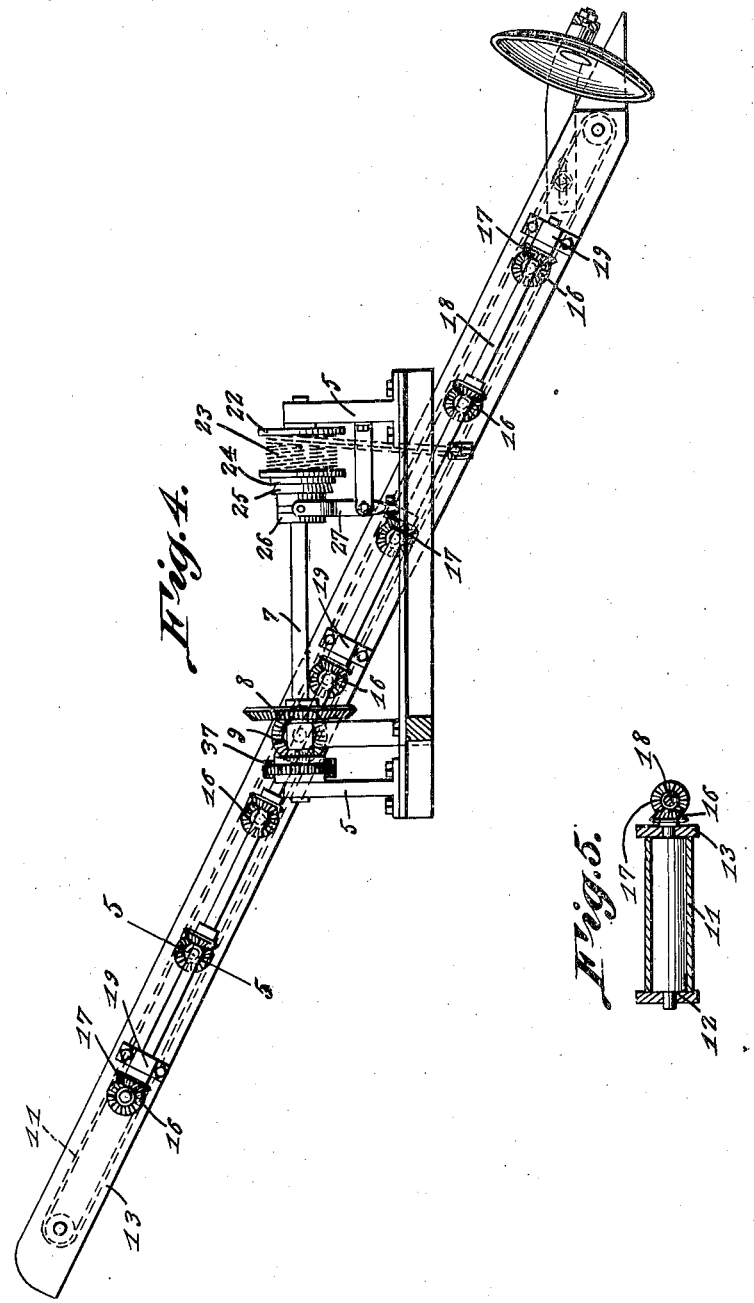

1,767,992

UNITED STATES PATENT OFFICE

ERNEST W. LILLY, OF RAYMOND, WASHINGTON

ATTACHMENT FOR TRACTORS

Application filed March 25, 1929. Serial No. 349,775.

My present invention has reference to a ditching and dirt elevating attachment for tractors.

My primary object is the provision of a mechanism of this type which will, by the propulsion of the tractor, dig a ditch of a desired depth, convey the dirt onto an elevator which will deliver the same either alongside of the road or to a wagon that travels along the side of the tractor and further wherein both the disc plow and the elevator may be swung to desired angles for not only regulating the depth of the ditch but permitting the device being propelled when not in operation.

For a full and comprehensive understanding of the invention reference is to be had to the drawings which accompany and form part of this application.

In the drawings:

Figure 1 is a plan view of the improvement attached to a tractor.

Figure 2 is a side elevation thereof.

Figure 3 is a rear elevation thereof.

Figure 4 is a sectional view approximately on the line 4—4 of Figure 1.

Figure 5 is a sectional view approximately on the line 5—5 of Figure 4.

In the drawings, the numeral 1 broadly indicates a tractor of the caterpillar type. For distinction the front axle of the tractor is indicated by the numeral 2, the driver's seat by the numeral 3, and a shaft carrying a sprocket wheel which is driven by the engine of the tractor 1 indicated by the numeral 4.

In carrying out my invention I fixedly secure to the rear of the body of the tractor spaced upstanding elements or standards 5, respectively and likewise support upon the rear, adjacent to one of the standards a third upstanding element or standard 6. The standards 5 are provided with suitable bearings in which is journaled a shaft 7, and on this shaft there is fixed a bevel gear 8 which is in mesh with the pinion 9 on the shaft 10 for the endless elevator 11. The side boards of the elevator are indicated for distinction by the numerals 12 and 13 and the shaft 10 has one end supported in a bearing 14 in the upright 6 and its second and outer end supported by a substantially U-shaped bracket 15 whose body portion is arranged below the elevator 11 and whose end is secured to the rear end of the tractor body.

There is journaled between the side boards 12 and 13 of the elevator, trunnions that carry rollers over which the endless flight carrying belt of the elevator travels. All of these rollers except the end rollers have their trunnions projecting beyond the inner side board 13 of the elevator and are provided with pinions 16 which are in mesh with similar pinions 17 on a shaft 18 which is journaled in suitable bearings 19. The shaft 10 which provides the pivotal support for the elevator is disposed beyond the center of the said element and carries a pinion 20 disposed to the rear of the pinion 9 and which is in mesh with the pinion 21 on the shaft 18.

The shaft 7 has freely rotatable thereon a drum 22 around which is trained and secured a flexible element such as a chain 23. The outer end of the chain is fixed to the side 13 of the elevator. On one end of the drum 13 there is a female friction member 24 whose bore is flared, and which when the drum is to be revolved with the shaft 7 is engaged by a conical male friction member 25. The friction member 25 is splined for slidable movement on the shaft 7 and carries a hub portion 26 provided with an annular groove in which are received the stud ends of a fork 27. The fork has pivotally connected therewith a bell crank lever 28 which is pivotally supported on the frame or body of the tractor and the second end of the bell crank lever has attached thereto a link 29 and the said link has its free end connected to an angle lever 30 that carries a foot pedal 31. The lever 30 is pivotally supported, as at 32, on the body of the tractor. Obviously by depressing the pedal 31 the clutch member 25 will be brought into engagement with the clutch member 24 and the drum will be rotated with the shaft while spring means is provided for influencing the male friction clutch member out of engagement with the female clutch member 24.

By reference to Figure 3 of the drawings it will be seen that the standard 5 adjacent to the gear 8 is of a materially greater height than the second standard 5, and the upper end of this standard has fixed thereon a stub shaft 34 on which is journaled a comparatively large sprocket wheel 35 and a smaller sprocket wheel 36. Trained around the sprocket wheel 35 and the sprocket wheel on the shaft 4 there is a sprocket chain 37.

Trained around the smaller sprocket wheel 36 and a similar sprocket wheel on the shaft 7 there is an endless chain 38. By this arrangement it will be noted that the elevator will be operated at a comparatively low speed regardless of the travel of the tractor.

Loosely and pivotally secured to the axle 2 there is one of the arms 39 of a hanger. A branch arm 40 is integrally formed with the arm 39, and is loosely supported on the body of the tractor. The longer arm 39 passes between the endless flights on the tractor wheels. The arm 39 is extended so that the same is disposed over the normally lower portion of the elevator 11, the same having an angle branch 41 provided with an elongated slot through which passes the headed bolt 42 which enters the side 12 of the elevator, the head of the bolt contacting with the angle end 41 of the hanger. By reference to Figure 1 of the drawings it will be noted that the connecting portion of the arm 39 between the parts 40 and 41 is disposed at an angle and this portion for distinction is indicated by the numeral 43. There is pivotally secured to the element 43 of the hanger, as indicated by the numeral 44, a disc plow 45. The plow is arranged in a line with the endless belt of the conveyor. By reference to Figure 3 it will be noted that the side 12 of the conveyor extends beyond the disc plow 45 and that the lower edge thereof is beveled or cut at an angle, as at 46.

The hanger and the weight of the conveyor cause the disc plow to enter the ground. The depth of the ditch made by the plow is limited by the adjustment of the chain 23 on the drum 22. The elevator, as previously stated, is operated at a comparatively low rate of speed and the disc plow not only serves as a ditching element but as a mold board for directing the dirt dug thereby onto the elevator. The elevator conveys the dirt onto the upper end thereof and delivers such dirt onto the side of the road or to a moving body provided for the reception of such dirt. The improvement may be readily attached to or removed from the tractor. When attached the normally lower end of the elevator may be raised and the elevation of this end will likewise elevate the disc plow 45 by the upward swinging of the hanger support for said disc plow, this being accomplished, of course, by bringing the male clutch 25 into engagement with the female clutch 24 on the drum 22.

The construction is extremely simple and the advantages thereof will be readily apparent to those skilled in the art without further detailed description.

Having described the invention, I claim:

1. A ditching and dirt elevating attachment for tractors comprising a hitch having inner angle arms which are loosely connected to the tractor and having an outer angle portion merging into a straight arm which is slotted, a ditching plow pivotally secured to the said angle arm, an endless elevator against whose outer side the end of the hitch rests, a removable headed element passing through the slot of the said end and entering the said side of the elevator, said elevator including a belt having end rolls and a plurality of intermediate rolls, a shaft secured to the tractor and pivotally supporting the elevator beyond the center thereof, supporting means between the outer end of the shaft and the tractor, and means between the elevator and tractor and operated by the engine of the tractor for imparting a simultaneous swinging to the hitch and to the lower end of the elevator and means also operated by the engine of the tractor for imparting a slow turning to the intermediate rolls of the elevator.

2. A ditching and dirt elevating attachment for tractors comprising a hitch having inner angle arms which are loosely connected to the tractor and having an outer angle portion merging into a straight arm which is slotted, a ditching plow pivotally secured to the said angle arm, an endless elevator against whose outer side the end of the hitch rests, a removable headed element passing through the slot of the said end and entering the said side of the elevator, said elevator including a belt having end rolls and a plurality of intermediate rolls, a shaft secured to the tractor and pivotally supporting the elevator beyond the center thereof, supporting means between the outer end of the shaft and the tractor, pinions fixed on the inner end of the intermediate rolls, a shaft journaled in bearings in the inner member of the elevator frame and having pinions to mesh with the first mentioned pinions, another pinion upon said shaft, a pinion upon the elevator supporting shaft meshing with said pinion, a second pinion on the elevator shaft, a transverse shaft journaled in bearings on the tractor carrying a beveled wheel to mesh with the last mentioned pinion, a drum freely journaled on said transverse shaft, a chain wound around the drum and and having its outer end connected to the elevator, pedal operated slidable clutch means between the transverse shaft and the drum for locking the drum on the shaft, and means operated by the engine of the tractor for imparting a slow turning to the transverse shaft.

In testimony whereof I affix my signature.

ERNEST W. LILLY.